US008462976B2

(12) United States Patent
Tamaru

(10) Patent No.: US 8,462,976 B2
(45) Date of Patent: Jun. 11, 2013

(54) VOICE CONFERENCE SYSTEM

(75) Inventor: Takuya Tamaru, Hamamatsu (JP)

(73) Assignee: Yamaha Corporation (JP)

( * ) Notice: Subject to any disclaimer, the term of this patent is extended or adjusted under 35 U.S.C. 154(b) by 1040 days.

(21) Appl. No.: 12/375,887

(22) PCT Filed: Aug. 1, 2007

(86) PCT No.: PCT/JP2007/065072
§ 371 (c)(1),
(2), (4) Date: Jan. 30, 2009

(87) PCT Pub. No.: WO2008/016080
PCT Pub. Date: Feb. 7, 2008

(65) Prior Publication Data
US 2010/0002899 A1    Jan. 7, 2010

(30) Foreign Application Priority Data

Aug. 1, 2006    (JP) .................................. 2006-210054

(51) Int. Cl.
*H04R 3/12* (2006.01)
*H04B 15/04* (2006.01)
*H04R 3/00* (2006.01)
*H04B 15/00* (2006.01)

(52) U.S. Cl.
USPC ............ 381/335; 381/92; 381/387; 381/94.1; 379/202.01

(58) Field of Classification Search
USPC ............ 381/335, 91, 92, 122, 387, 388, 94.1, 381/94.8, 94.9; 379/202.01
See application file for complete search history.

(56) References Cited

U.S. PATENT DOCUMENTS

| | | | | |
|---|---|---|---|---|
| 4,461,025 A | * | 7/1984 | Franklin | 381/56 |
| 4,653,102 A | * | 3/1987 | Hansen | 381/92 |
| 5,319,736 A | * | 6/1994 | Hunt | 704/227 |
| 5,473,702 A | * | 12/1995 | Yoshida et al. | 381/94.7 |

(Continued)

FOREIGN PATENT DOCUMENTS

| | | |
|---|---|---|
| JP | 03-136557 A | 6/1991 |
| JP | 8-204803 A | 8/1996 |

(Continued)

OTHER PUBLICATIONS

JP 09-261351 Transaltion Document; May 9, 2013.*

(Continued)

*Primary Examiner* — Edgardo San Martin
(74) *Attorney, Agent, or Firm* — Rossi, Kimms & McDowell LLP

(57) ABSTRACT

A voice conference system has a first voice-conference device having a speaker directed toward a first conferee and a second speaker directed toward a second conferee in one talk session room, and a second voice-conference device having a speaker directed to a third conferee and a fourth speaker directed toward a fourth conferee in another talk session room. When the first conferee talks, voice collecting beam signals picked up by microphones of the one voice conference device in excess of a predetermined threshold value are selected. The one voice conference device acquires voice collecting direction information, and then transmits voice communication data containing the voice collecting beam signal and the acquired voice collecting direction information to the another voice conference device, which acquires the voice collecting direction information from the received voice communication data, and emits the voice of the first conferee from the first speaker.

6 Claims, 7 Drawing Sheets

U.S. PATENT DOCUMENTS

| | | | | |
|---|---|---|---|---|
| 5,561,737 A | * | 10/1996 | Bowen | 704/275 |
| 5,625,697 A | * | 4/1997 | Bowen et al. | 381/92 |
| 5,664,021 A | * | 9/1997 | Chu et al. | 381/92 |
| 5,757,937 A | * | 5/1998 | Itoh et al. | 381/94.3 |
| 5,778,085 A | | 7/1998 | Sasaki | |
| 6,049,607 A | * | 4/2000 | Marash et al. | 379/406.08 |
| 6,130,949 A | * | 10/2000 | Aoki et al. | 381/94.3 |
| 6,339,758 B1 | * | 1/2002 | Kanazawa et al. | 704/226 |
| 6,963,649 B2 | | 11/2005 | Vaudrey et al. | 381/94.7 |
| 7,046,812 B1 | | 5/2006 | Kochanski et al. | 381/92 |
| 7,054,451 B2 | * | 5/2006 | Janse et al. | 381/83 |
| 7,116,791 B2 | * | 10/2006 | Matsuo | 381/92 |
| 7,492,908 B2 | * | 2/2009 | Griesinger | 381/56 |
| 7,562,013 B2 | * | 7/2009 | Gotanda et al. | 704/228 |
| 7,567,676 B2 | * | 7/2009 | Griesinger | 381/56 |
| 7,567,678 B2 | * | 7/2009 | Kong et al. | 381/92 |
| 7,778,425 B2 | * | 8/2010 | Kajala et al. | 381/92 |
| 8,111,838 B2 | * | 2/2012 | Tokuda et al. | 381/92 |
| 8,180,067 B2 | * | 5/2012 | Soulodre | 381/92 |
| 8,184,828 B2 | * | 5/2012 | Christoph | 381/94.2 |
| 2003/0026437 A1 | | 2/2003 | Janse et al. | |
| 2005/0058300 A1 | * | 3/2005 | Suzuki et al. | 381/92 |
| 2008/0285771 A1 | * | 11/2008 | Tanaka et al. | 381/92 |
| 2009/0228272 A1 | * | 9/2009 | Herbig et al. | 704/233 |
| 2009/0310794 A1 | * | 12/2009 | Ishibashi et al. | 381/66 |
| 2010/0166212 A1 | * | 7/2010 | Ishibashi et al. | 381/92 |
| 2010/0172514 A1 | * | 7/2010 | Ishibashi | 381/94.1 |
| 2011/0019836 A1 | * | 1/2011 | Ishibashi et al. | 381/92 |
| 2011/0051940 A1 | * | 3/2011 | Ishikawa et al. | 381/22 |

FOREIGN PATENT DOCUMENTS

| | | |
|---|---|---|
| JP | 8-298696 A | 11/1996 |
| JP | 9-261351 A | 10/1997 |
| JP | 2004-537232 A | 9/2004 |
| JP | 2005-80110 A | 3/2005 |
| JP | 2008109686 A * | 5/2008 |

OTHER PUBLICATIONS

International Search Report issued in related PCT/JP2007/065072, mailed Aug. 28, 2007.

Office Action issued Jun. 21, 2011 for corresponding JP Application No. 2006-210054.

Notification of First Office Action for corresponding CN 200780028661.3, dated Jan. 19, 2012. Reference cited within has already been submitted to the USPTO via previous IDS. English translation provided.

Original Chinese Notification of the Decision of Rejection issued in Chinese Patent Application No. 200780028661.3 dated Mar. 4, 2013, English Translation is provided.

* cited by examiner

VOICE CONFERENCE SYSTEM

TECHNICAL FIELD

The present invention relates to a for holding a talk session by connecting two voice conference devices that are located in remote positions mutually.

BACKGROUND ART

In the prior art, when conferees will hold a talk session between two locations that are remote mutually, the voice conference device set forth in Patent Literature 1 or Patent Literature 2 is arranged in respective locations, and then the conferees are seated around this voice conference device to hold the session.

In the voice conference devices in Patent Literature 1 and Patent Literature 2, one speaker is arranged at a center of the case to emit a voice from a ceiling to the outside, and also a plurality of microphones whose voice collecting direction is set in a different direction respectively are arranged at respective corner portions of side surfaces.

In such conventional voice conference devices, voices generated in different directions are picked up by the microphones respectively and then voice signals are sent out to the voice conference device on the opposite side. In contrast, when the voice conference device on this side receives the voice signals that are collected by the voice conference device on the opposite side, such voice conference device emits the voices as they are.

Patent Literature 1: JP-A-8-298696
Patent Literature 2: JP-A-8-204803

DISCLOSURE OF THE INVENTION

Problems that the Invention is to Solve

However, in the above voice conference system in the prior art, when a plurality conferees are seated mutually around the voice conference devices, the voice is not always emitted from the voice conference device on the voice emitter side every conferee who talks in session, but voices of all conferees are emitted as they are. Therefore, even though a plurality conferees are attending the session in respective session rooms, the voice conference system cannot create such a feeling of presence that a plurality of persons are holding the session together, in respective conferees.

Also, even when the conferees are seated in the same session room, in some cases they would like to talk to a different person respectively and also they would like to discuss the different subject respectively. That is, often the conferees would like to discuss a plurality of subjects in parallel. However, in the above voice conference system in the prior art, the voices are emitted from one speaker to all conferees (omnidirectionally), and therefore the conferees cannot discuss individually a plurality of subjects in parallel.

Therefore, it is an object of the present invention to provide a voice conference system that can realize a talk session with an unbounded feeling of presence in session in response to positions of the conferees who are seated at mutual voice conference devices, and enables respective conferees to have talk sessions about a plurality of subjects individually in parallel.

Means for Solving the Problems

The present invention relates to a voice conference system that is equipped with a plurality of voice conference devices connected mutually via connecting portions, and each of a plurality of voice conference devices includes a circular plate-like case, a plurality of unidirectional microphones arranged on a circumference of the case, and a plurality of speakers arranged on a circumference of the case. Each of two voice conference devices of the voice conference system of the present invention includes a voice collecting portion, a communication controlling portion, and a voice emitting portion, which are described in the following.

The voice collecting portion of the present invention forms voice collecting beam signals from voice collecting signals picked up by the plurality of unidirectional microphones in plural different voice collecting directions respectively, selects the voice collecting beam signal based on the voice emitted from a conferee from the formed voice collecting beam signals, and detects voice collecting direction information corresponding to the selected voice collecting beam signal.

The communication controlling portion of the present invention produces voice communication data having the voice collecting beam signal selected by the voice collecting portion and the voice collecting direction information detected by the voice collecting portion then transmits the data to a voice conference device on the opposite side, acquires the voice collecting direction information and the voice collecting beam signal contained in the voice communication data received from the voice conference device on the opposite side, and gives a voice-emitting voice signal produced from the acquired voice collecting beam signal and the voice collecting direction information to a voice emitting portion; and The voice emitting portion of the present invention produces voice emitting signals that are supplied to the plurality of speakers, based on the voice-emitting voice signal received from the communication controlling portion and the voice collecting direction information sent from the destination voice conference device.

According to this configuration, the voice conference device is shaped like the circular plate, and therefore the conferees are seated to surround the voice conference device. Respective microphones are a unidirectional microphone respectively, and are arranged around a circumference. Therefore, even though the voice arrives from any direction out of all directions of the circular voice conference device, the microphone having the directivity in the direction along which that voice arrives is always present, and thus the voice that is in excess of a predetermined level is picked up by the corresponding microphone. Of course, the corresponding microphone is not limited to a single microphone, and plural neighboring microphones may be used as the corresponding microphone.

Based on the above configuration, the voice collecting portion forms the voice collecting beam signals whose center direction of the directivity is set to a different direction respectively from the voice collecting signals of a plurality of microphones, and detects signal levels of respective voice collecting beam signals. Then, the signal level of the voice collecting beam signal corresponding to the arriving direction of the voice becomes high. Therefore, the voice collecting portion selects the voice collecting beam signal whose signal level is in excess of a predetermined threshold value, and outputs this signal to the communication controlling portion. Also, the vice collecting portion detects the direction of the directivity of the selected voice collecting beam signal as voice collecting direction information, and outputs this information together with the voice collecting beam signal to the communication controlling portion. At this time, the voice collecting beam signal and the voice collecting direction information may be selected in plural if the signal level exceeds a threshold value.

The communication controlling portion produces the voice communication data having the voice collecting beam signal and the voice collecting direction information, and transmits the data to the voice conference device on the opposite side. Accordingly, the voice collecting beam signal formed of the voice emitted from the talker (conferee) and the voice collecting direction information indicating the direction of the talker of the voice conference device are transmitted to the voice conference device on the opposite side.

In contrast, when the communication controlling portion receives the voice communication data containing the voice collecting beam signal and the voice collecting direction information from the voice conference device on the opposite side, such communication controlling portion gives the voice-emitting voice signal and the voice collection direction information based on the voice collecting beam signal to the voice emitting portion.

The voice emitting portion sets the emitted voice signal to respective speakers based on the voice collection direction information and the voice-emitting voice signal such that the conferee who is seated can hear the voice emitted from the corresponding conferee (the talker) from the concerned direction. Respective speakers convert the supplied voice emitting signals into the voices, and emit the voice mainly in the front direction of the talker. Accordingly, the direction along which the voice is emitted is changed in response to the position of the conferee.

Also, when the conferees who attend the voice conference devices respectively are seated to face to respective speakers, the conferees who are seated to face to the corresponding speakers mutually can hold the talk session respectively, based on such a function that the voice emitting direction (the direction of the talker) can be discriminated. Then, since the voice conference device is shaped like the circular plate, the voices emitted from respective speakers are hard to interfere with each other. Therefore, even when the conferees are holding the talk session about the different subjects respectively, each conferee is ready to hear the target voice only.

Also, the voice collecting portion of the voice conference system of the present invention includes a regression voice removing portion for producing a quasi regression voice signal based on the selected voice collecting beam signal and the received voice-emitting voice signal, and then subtracting the quasi regression voice signal from the selected voice collecting beam signal.

According to this configuration, the go-around voice component based on the voice-emitting voice signal contained in the voice collecting beam signal is removed. Therefore, the voice collecting beam signal with a high S/N ratio can be obtained, and can be transmitted to the voice conference device on the opposite side.

The present invention relates to a voice conference system that is equipped with a plurality of voice conference devices connected mutually via connecting portions, and each of a plurality of voice conference devices includes a circular plate-like case, a plurality of unidirectional microphones arranged on a circumference of the case, and a plurality of speakers arranged on the circumference of the case. Each of a plurality of voice conference devices of the voice conference system of the present invention includes a voice collecting portion, and a communication controlling portion, which are described in the following.

The voice collecting portion of the present invention forms voice collecting beam signals from voice collecting signals picked up by the plurality of unidirectional microphones in plural different voice collecting directions respectively, selects the voice collecting beam signal based on the voice emitted from a conferee from the formed voice collecting beam signals, and detects voice collecting direction information corresponding to the selected voice collecting beam signal.

The communication controlling portion of the present invention converts the voice collecting beam signal selected by the voice collecting portion into a voice emitting signal for a destination voice conference device based on the detected voice collecting direction information and then transmits the voice emitting signal, and gives the voice emitting signal received from the destination voice conference device to a plurality of speakers.

According to this configuration, the voice collecting portion forms the voice collecting beam signals whose center direction of the directivity is set to a different direction respectively from the voice collecting signals of a plurality of microphones, and detects signal levels of respective voice collecting beam signals. Then, the signal level of the voice collecting beam signal corresponding to the arriving direction of the voice becomes high. Therefore, the voice collecting portion selects the voice collecting beam signal whose signal level is in excess of a predetermined threshold value, and outputs this signal to the communication controlling portion. Also, the vice collecting portion detects the direction of the directivity of the selected voice collecting beam signal as voice collecting direction information, and outputs this information as well as the voice collecting beam signal to the communication controlling portion. At this time, the voice collecting beam signal and the voice collecting direction information may be selected in plural if the signal level exceeds a threshold value.

The communication controlling portion produces the voice emitting signals, which are supplied to respective speakers of the destination voice conference devices, based on the voice collecting beam signal and the voice collecting direction information, and transmits the signals via different signal lines to the destination voice conference devices respectively. Also, when the communication controlling portion receives the voice emitting signals from the destination voice conference devices, such communication controlling portion gives the signals to the corresponding speakers as they are. Then, respective speakers emit the supplied voices based on the voice emitting signals. With such configuration, the voices can be emitted in response to the voice collecting positions unless the voice collecting direction information are transmitted/received.

Also, the voice collecting portion of the voice conference system of the present invention includes a regression voice removing portion for producing a quasi regression voice signal based on the selected voice collecting beam signal and the received voice emitting signal, and then subtracting the quasi regression voice signal from the selected voice collecting beam signal.

According to this configuration, the go-around voice component based on the voice-emitting voice signal contained in the voice collecting beam signal is removed. Therefore, the voice collecting beam signal with a high S/N ratio can be obtained, and then the voice collecting beam signal with a high S/N ratio can be transmitted to the destination voice conference devices.

Advantages of the Invention

According to the present invention, in response to a situation of the talk session that a plurality of conferees are attending respectively, either the talk session in which a plurality of conferees can discuss mutually the subjects with an unbounded feeling of presence can be held or a plurality of talk sessions can be held simultaneously. Therefore, the voice conference system that provides excellent easy of use can be accomplished.

Figure 1:
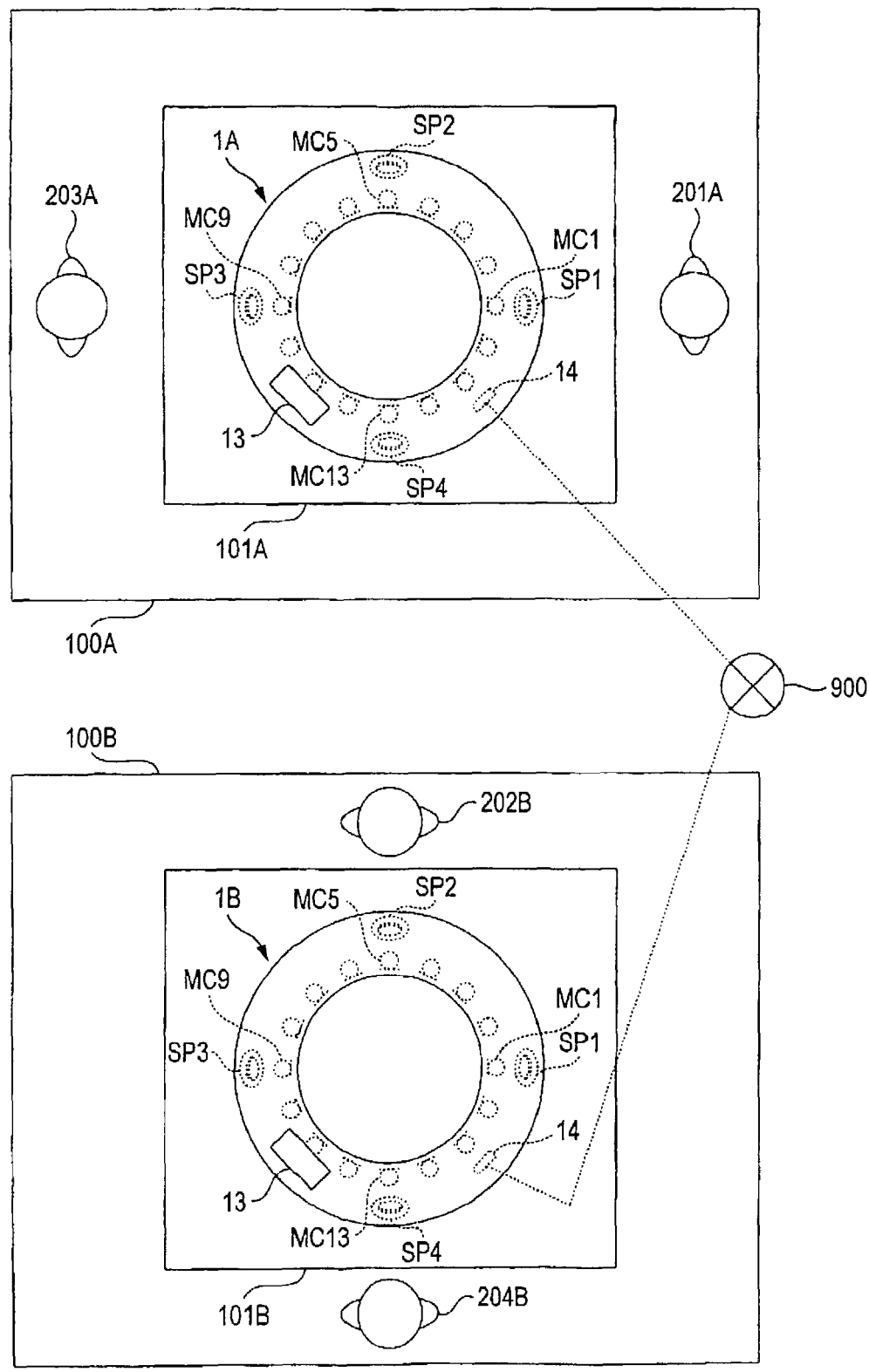
[FIG. 1] A configurative view of a voice conference system according to a first embodiment of the present invention.

DESCRIPTION OF REFERENCE NUMERALS AND SIGNS 1, 1A, 1B voice conference device
11 case
12 hollow portion
13 operating portion
14 input/output I/F
21 communication controlling portion
22 voice-emission controlling portion
23 D/A converter
24 voice emitting amplifier
25 voice collecting amplifier
26 A/D converter
27 voice collecting beam generating portion
28 voice collecting beam selecting portion
29, 29' echo canceling portion
100A, 100B session room
101A, 101B session table
201A to 204A, 201B to 204B conferee
301A, 302A, 302B, 303A, 304A, 304B voice (picked-up voice)
401A, 401B, 402B, 403A, 403B, 4048 voice (emitted voice)
900 network
SP1 to SP4 speaker
MC1 to MC16 microphone

BEST MODE FOR CARRYING OUT THE INVENTION

A voice conference system according to an embodiment of the present invention will be explained with reference to the drawings hereinafter.

FIG. 1 is a configurative view of a voice conference system according to a first embodiment of the present invention.

Figure 2:
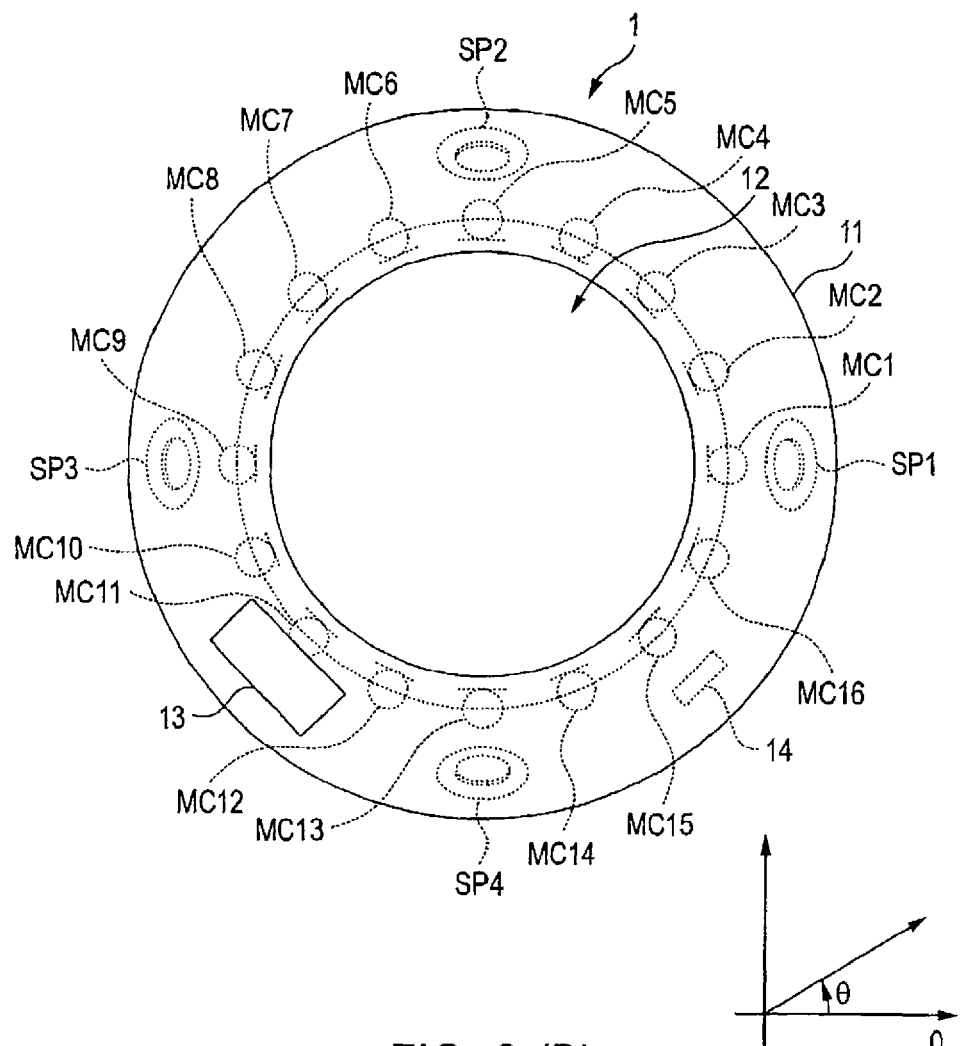
[FIG. 2] An external view of a voice conference device used in the voice conference system of the first embodiment.
Figure 2:
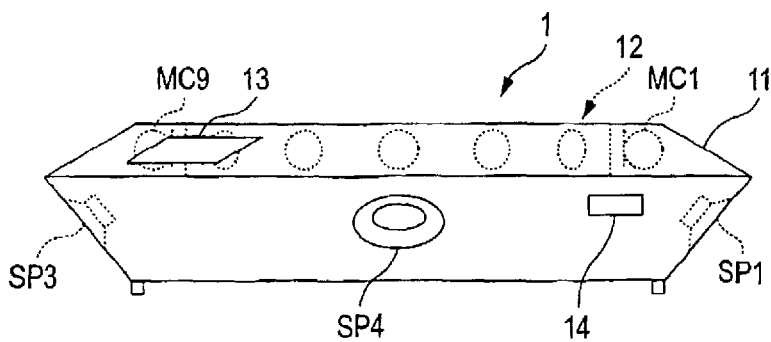

FIG. 2 is an external view of a voice conference device used in the voice conference system of the first embodiment, wherein (A) is a plan view, and (B) is a side view. In FIG. 2, θ denotes an angle that is increased anticlockwise around a center of a voice conference device 1, when viewed from the top as a center of rotation, where the direction in which a microphone MC1 and a speaker SP1 are placed is set to 0°.

Figure 3:
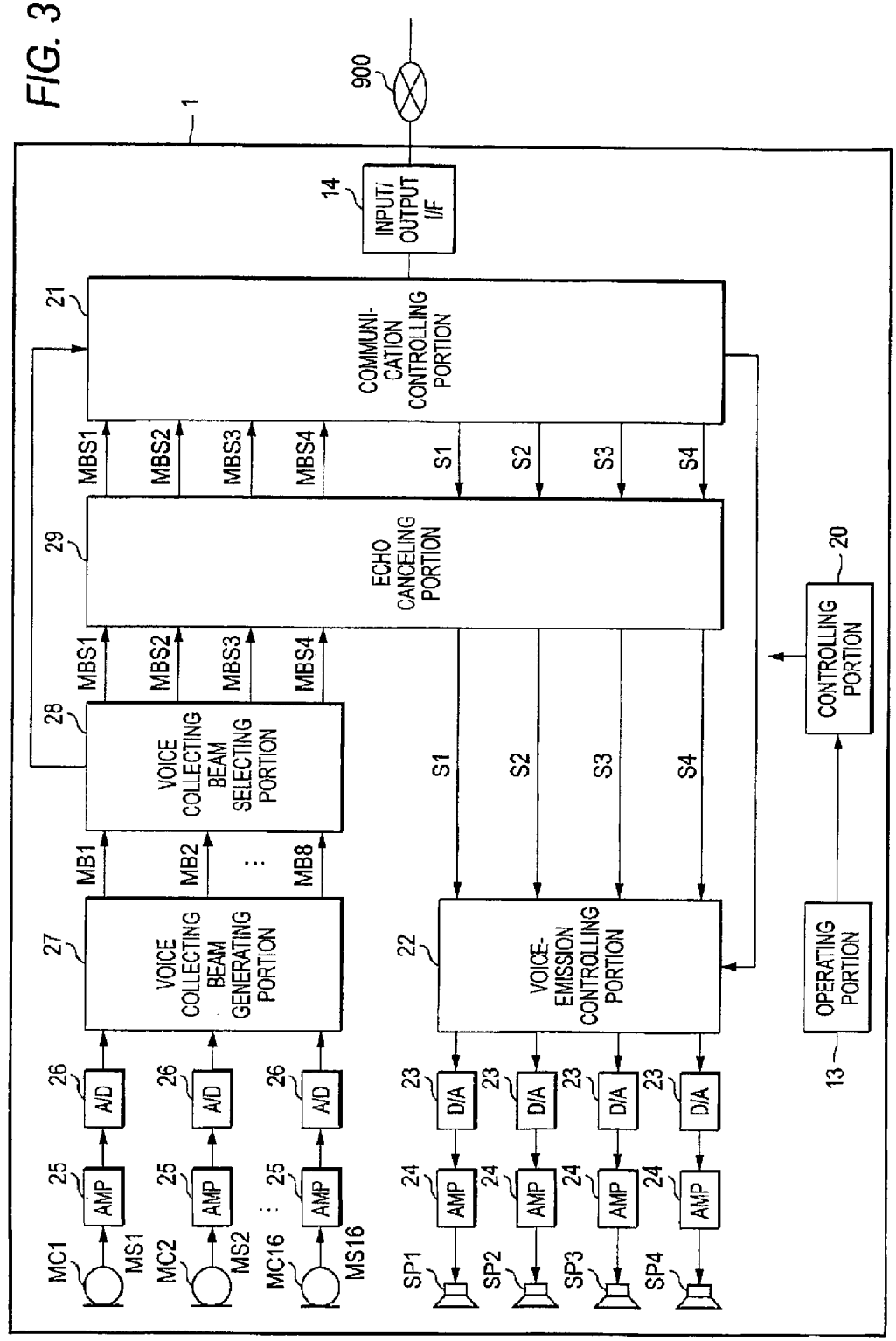
[FIG. 3] A functional block diagram of the voice conference device shown in FIG. 2.

FIG. 3 is a functional block diagram of the voice conference device shown in FIG. 2.

As shown in FIG. 1, the voice conference system is equipped with voice conference devices 1A, 1B that are arranged in session rooms 100A, 100B in two remote locations respectively. These voice conference devices 1A, 1B are connected mutually via a network 900. Also, session tables 101A, 101B are set up on almost centers of the session rooms 100A, 100B respectively, and the voice conference devices 1A, 1B are put on the session tables 101A, 101B respectively. An input/output I/F 14 is provided to the voice conference devices 1A, 1B respectively, and the voice conference devices 1A, 1B are connected to the network via the input/output I/F 14. For example, conferees 201A, 203A are seated at the session table 101A oppositely to put the voice conference device 1A between them, and the conferee 201A is seated on the speaker SP1 side of the voice conference device 1A and the conferee 203A is seated on the speaker SP3 side of the voice conference device 1A. Also, conferees 202B, 204B are seated at the session table 101B oppositely to put the voice conference device 1B between them, and the conferee 202B is seated on the speaker SP2 side of the voice conference device 1B and the conferee 204B is seated on the speaker SP4 side of the voice conference device 1B.

The voice conference devices 1A, 1B are constructed according to the same specification and have a circular plate-like case 11 respectively. Specifically speaking, the case 11 is shaped such that a shape when viewed from the top is circular, respective areas of a top surface and an bottom surface are narrower than an area of a portion located in the middle of the vertical direction, and a shape when viewed from the side is narrowed toward the top surface from one point in the height direction and is also narrowed toward the bottom surface from this one point. That is, the case 11 is shaped to have an inclined surface from this one point toward the upper side and the lower side respectively. A hollow portion 12 that is narrower in area than the top surface and has a predetermined depth is formed in the top surface of the case 11. The hollow portion 12 is set such that a center of this hollow portion 12 when viewed from the top coincides with a center of the top surface.

Also, 16 microphones MC1 to MC16 are provided in the inside of the case 11 on the top surface side along the side surface of the hollow portion 12. The microphones MC1 to MC16 are aligned at an equally angled pitch (in this case, about 22.5° interval) around a center of the voice conference device 1, when viewed from the top, as a center of rotation. At this time, the microphone MC1 is set in the direction of θ=0°, and the microphones MC1 to MC16 are aligned along the direction in which θ is increased sequentially by 22.5°. For example, the microphone MC5 is arranged in the direction of θ=90°, the microphone MC9 is arranged in the direction of θ=180°, and the microphone MC13 is arranged in the direction of θ=270°. Also, the microphones MC1 to MC16 are the unidirectional microphone respectively, and are arranged to have the sharp directivity toward the center of the case 11, when viewed from the top, respectively. For example, the microphone MC1 has the direction of θ=180° as a center of the directivity, the microphone MC5 has the direction of θ=270° as a center of the directivity, the microphone MC9 has the direction of θ=0 (360)° as a center of the directivity, and the microphone MC13 has the direction of θ=90° as a center of the directivity. In this case, the number of the microphones is not limited to this example, and the microphones may be provided appropriately according to the specification.

Also, four speakers SP1 to SP4 are provided respectively such that the inclined surface of the case 11 on the lower side coincides with a voice emitting plane. Respective speakers SP1 to SP4 are aligned at an equally angled pitch (in this case, about 90° interval) around a center of the voice conference device 1, when viewed from the top, as a center of rotation. At this time, the speaker SP1 is arranged in the same direction of $\theta=0°$ as the microphone MC1, the speaker SP2 is arranged in the same direction of $\theta=90°$ as the microphone MC5, the speaker SP3 is arranged in the same direction of $\theta=180°$ as the microphone MC9, and the speaker SP4 is arranged in the same direction of $\theta=270°$ as the microphone MC13. Also, the speakers SP1 to SP4 have the sharp directivity in the front direction of the voice emitting plane respectively. The speaker SP1 emits the voice strongly mainly in the direction of $\theta=0°$, the speaker SP2 emits the voice strongly mainly in the direction of $\theta=90°$, the speaker SP3 emits the voice strongly mainly in the direction of $\theta=180°$, and the speaker SP4 emits the voice strongly mainly in the direction of $\theta=270°$.

An operating portion 13 is provided on the inclined surface of the case 11 on the upper side. Although not shown, the operating portion 13 is equipped with various operation buttons and a liquid crystal display panel.

The input/output I/F 14 is provided on the inclined surface of the case 11 on the lower side in a position where the speakers SP1 to SP4 are not provided. Although not shown, the input/output I/F 14 is equipped with a network connect terminal, digital audio terminals, analog audio terminals, and the like. The voice conference device is connected to the foregoing network 900 by connecting a network cable to the network connect terminal.

The voice conference device 1 has a functional configuration as shown in FIG. 3 as well as the above structural configuration.

A controlling portion 20 executes the overall control such as setting, voice collection, voice emission, etc. of the voice conference device 1. Also, the controlling portion 20 applies the control to respective portions of the voice conference device 1 based on the contents if the operating instruction being input by the operating portion 13.

(1) Voice Collection

The foregoing microphones MC1 to MC16 pick up the voices such as the voices emitted from the conferees, etc. from the outside, and produce voice collecting signals MS1 to MS16 respectively. Then, voice collecting AMPs (amplifiers) 25 amplify the corresponding voice collecting signals MS1 to MS16 at a predetermined amplification factor respectively. Then, A/D converters 26 apply an analog-digital conversion to the amplified voice collecting signals MS1 to MS16 respectively, and output converted signals to a voice collecting beam generating portion 27.

The voice collecting beam generating portion 27 sets adequate combinations of the voice collecting signals MS1 to MS16 (digital data), and applies delaying/adding processes, etc. to the combined voice collecting signals mutually. Thus, the voice collecting beam generating portion 27 produces voice collecting beam signals MB1 to MB8 whose voice collecting directions are set to eight different directions respectively.

For example, according to the arrangement of the microphones, the voice collecting beam signal MB1 having the sharp directivity in the direction of $\theta=180°$ is produced by adding the voice collecting signals MS16, MS1, MS2. Similarly, the voice collecting beam signal MB2 having the sharp directivity in the direction of $\theta=225°$ is produced by adding the voice collecting signals MS2, MS3, MS4. Also, the voice collecting beam signal MB3 having the sharp directivity in the direction of $\theta=270°$ is produced by adding the voice collecting signals MS4, MS5, MS6. Also, the voice collecting beam signal MB4 having the sharp directivity in the direction of $\theta=315°$ is produced by adding the voice collecting signals MS6, MS7, MS8. Also, the voice collecting beam signal MB5 having the sharp directivity in the direction of $\theta=360 (0)°$ is produced by adding the voice collecting signals MS8, MS9, MS10. Also, the voice collecting beam signal MB6 having the sharp directivity in the direction of $\theta=45°$ is produced by adding the voice collecting signals MS10, MS11, MS12. Also, the voice collecting beam signal MB7 having the sharp directivity in the direction of $\theta=90°$ is produced by adding the voice collecting signals MS12, MS13, MS14. Also, the voice collecting beam signal MB8 having the sharp directivity in the direction of $\theta=135°$ is produced by adding the voice collecting signals MS14, MS15, MS16. In this manner, the voice collecting beam signals MB1 to MB8 center directions of the directivities of which are shifted at an interval of 45° in sequence can be produced. As a result, the voices coming from all directions of the voice conference device 1 can be picked up by any one of the voice collecting beam signals MB1 to MB8 being set at an equal interval. In this case, the number of the produced voice collecting signals is not limited to this example, and the voice collecting signals may be provided appropriately according to the specification.

A voice collecting beam selecting portion 28 detects signal levels of the voice collecting beam signals MB1 to MB8, and selects the voice collecting beam signal whose signal is in excess of a predetermined threshold value. In this case, the voice collecting beam selecting portion 28 only selects the voice collecting beam signal that is more than a predetermined threshold value. In the following, the case where four voice collecting beam signals exceed a predetermined threshold value will be explained hereunder.

Chosen voice collecting beam signals (selected voice collecting beam signals) MBS1 to MBS4 are input into an echo canceling portion 29. Also, the voice collecting beam selecting portion 28 detects the directions corresponding to the voice collecting beam signals MBS1 to MBS4, and gives the directions to a communication controlling portion 21 as voice collecting direction information.

The echo canceling portion 29 has echo canceling circuits for every input selected voice collecting beam signals MBS1 to MBS4. The echo canceling circuit is constructed by an adaptive filter for producing a pseudo regression voice signal based upon voice-emitting voice signals S1 to S4 from the input selected voice collecting beam signals, and a post processor for subtracting the pseudo regression voice signal from the selected voice collecting beam signal. The echo canceling circuit subtracts the pseudo regression voice signal from the selected voice collecting beam signals while optimizing sequentially filter coefficients of the adaptive filter, and thus removes components that go around from the speakers SP1 to SP4 to the microphones MC1 to MC16 and are contained in the selected voice collecting beam signals. The selected voice collecting beam signals MBS1 to MBS4 from which the go-around component is removed respectively are output to the communication controlling portion 21.

The communication controlling portion 21 produces voice communication data by correlating the selected voice collecting beam signals MBS1 to MBS4, from which the pseudo regression voice signal has been removed by echo canceling portion 29, with the voice collecting direction information from the voice collecting beam selecting portion 28, and outputs the data to the input/output I/F 14. For example, when respective selected voice collecting beam signals MBS1 to MBS4 are present simultaneously, the voice communication data has such a data structure that voice data based upon the selected voice collecting beam signals MBS1 to MBS4 are inserted sequentially every unit of a predetermined time, which is divided in time series, respectively. Then, the voice collecting direction information is attached to the voice data in each time unit in the form of a header, or the like The voice communication data constructed in this manner is sent out to the destination voice conference device via the input/output I/F 14 and the network 900.

(2) Voice Emission

The communication controlling portion 21 acquires the voice data from the voice communication data received from the destination voice conference device via the input/output I/F 14, and outputs the voice data as voice-emitting voice signals. Also, the communication controlling portion 21 extracts the voice collecting direction information being correlated with the voice data of the voice communication data in the destination voice conference device, and gives the information to a voice-emission controlling portion 22. The communication controlling portion 21 discriminates the voice-emitting voice signals based on the voice collecting direction information every voice collecting direction (talker direction), and outputs the result. For example, as shown in FIG. 3, when the voice-emitting voice signals are four types, the voice collecting direction information are also four types, the voice communication data are discriminated into voice-emitting voice signals S1 to S4 and are output. The voice-emitting voice signals S1 to S4 output from the communication controlling portion 21 is supplied to the voice-emission controlling portion 22 via the echo canceling portion 29. The voice-emitting voice signals S1 to S4 input into the echo canceling portion 29 are used in the above-mentioned echo canceling process.

The voice-emission controlling portion 22 makes a mixing of the voice-emitting voice signals S1 to S4 at predetermined signal levels based on the voice-emitting voice signals S1 to S4 and the related voice collecting direction information, and thus produces emitted voice signals SS1 to SS4 that are supplied to the speakers SP1 to SP4. For example, when the voice collecting direction information of the voice-emitting voice signal S1 is $\theta=180°$, the voice-emission controlling portion 22 gives a component of the voice-emitting voice signal S1 at a high signal level as the emitted voice signal SS3 for the speaker SP3, and does not give the component of the voice-emitting voice signal S1 to the emitted voice signals SS1, SS2, SS4 for other speakers SP1, SP2, SP4. Also, when the voice collecting direction information of the voice-emitting voice signal S2 is $\theta=135°$, the voice-emission controlling portion 22 gives the component of the voice-emitting voice signal S2 at the same signal level as the emitted voice signals SS2, SS3 for the speakers SP2, SP3, and does not give the component of the voice-emitting voice signal S2 to the emitted voice signals SS1, SS4 for other speakers SP1, SP4. Also, when the voice collecting direction information of the voice-emitting voice signal S1 is $\theta=180°$ and the voice collecting direction information of the voice-emitting voice signal S2 is $\theta=135°$, the voice-emission controlling portion 22 gives a component of the voice-emitting voice signal S1 at a high signal level as the emitted voice signal SS3 for the speaker SP3, and also gives the component of the voice-emitting voice signal S2 at the same signal level as that of the emitted voice signal SS3 as the emitted voice signal SS2 for the speaker SP2. In this case, the voice-emission controlling portion 22 does not give the component of the voice-emitting voice signal S2 to the emitted voice signals SS1, SS4 for other speakers SP1, SP4. As a result, the emitted voice signal SS3 being produced by mixing the voice-emitting voice signals S1, S2 at a predetermined signal level ratio and the emitted voice signal SS2 consisting only of the voice-emitting voice signal S2 are produced, and are supplied to the speakers SP3, SP2 respectively.

A D/A converter 23 applies a digital-analog conversion to the emitted voice signals SS1 to SS4. A voice emitting amplifier (AMP) 24 amplifies the emitted voice signals SS1 to SS4 at a predetermined amplification factor, and gives the amplified signals to the speakers SP1 to SP4 respectively.

The speakers SP1 to SP4 convert the supplied emitted voice signals SS1 to SS4 into the voices, and then emit the voices respectively.

With this configuration, the voices are emitted from respective positions of the voice conference device on the voice emitting side corresponding to the positions of the talkers who attend the voice conference device on the voice collecting side. Therefore, respective conferees who attend the voice conference device on the voice emitting side can feel as if the talkers who attend the voice conference device on the voice collecting side are attending the voice conference device on the voice emitting side and are talking now. As a result, the remote session with an unbounded feeling of presence can be held.

Next, concrete using examples will be explained with reference to the drawings hereunder.

Figure 4:
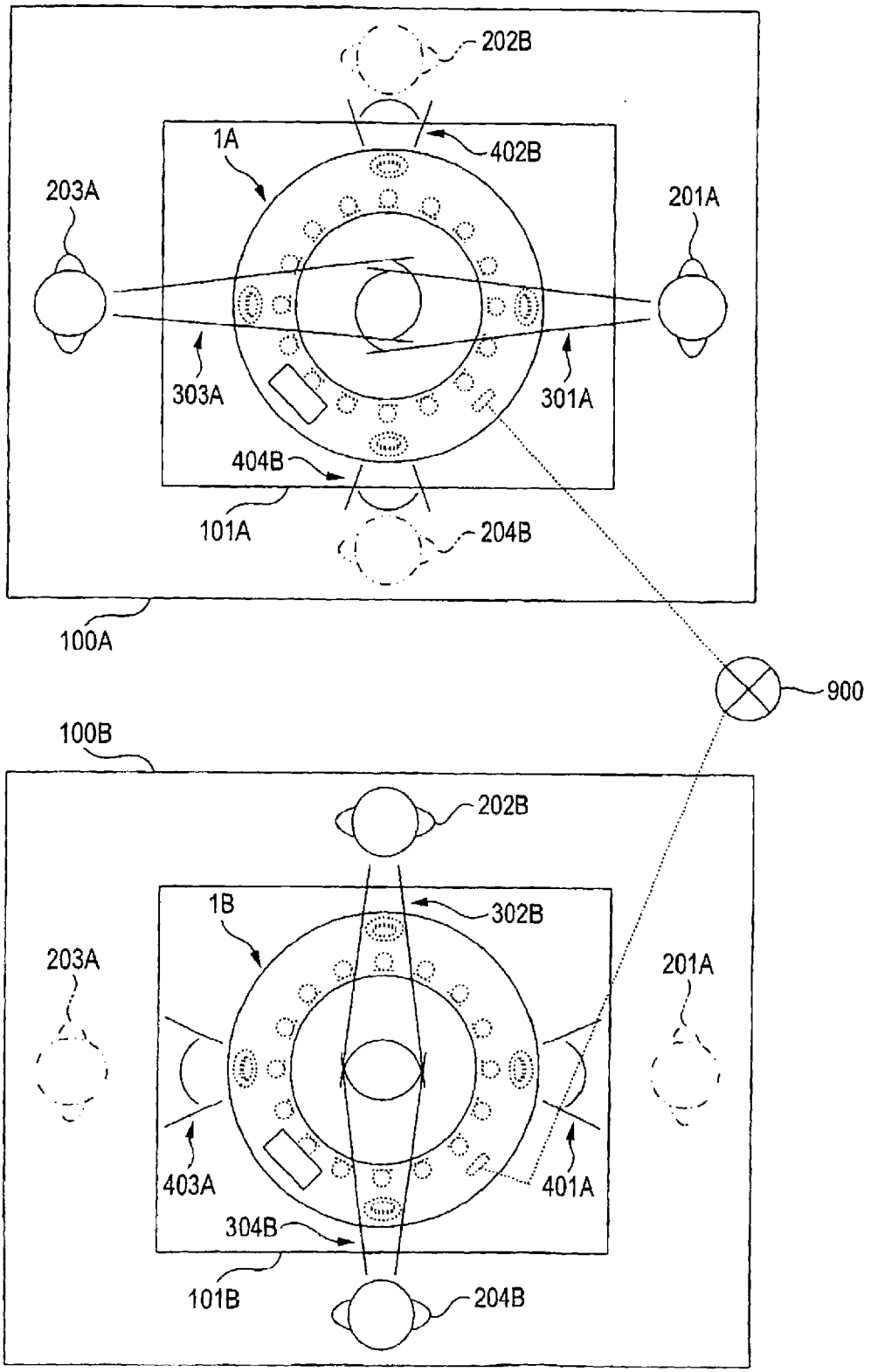
[FIG. 4] A view explaining a voice emitting/collecting state when conferees 201A, 203A, 202B, 204B talk to each other in a situation shown in FIG. 1 respectively.

FIG. 4 is a view explaining a voice emitting/collecting state when conferees 201A, 203A, 202B, 204B talk to each other in a situation shown in FIG. 1 respectively.

In the cases in FIG. 1 and FIG. 4, in the session room 100A, the conferee 201A is seated in the direction of $\theta=0°$ of the voice conference device 1A, and the conferee 203A is seated in the direction of $\theta=180°$ of the voice conference device 1A. Also, in the session room 100B, the conferee 202B is seated in the direction of $\theta=90°$ of the voice conference device 1B, and the conferee 204B is seated in the direction of $\theta=270°$ of the voice conference device 1B.

When the conferee 201A in the session room 100A talks, a voice 301A is picked up by the voice conference device 1A. At this time, the voice 301A is picked up mainly by the microphones MC8, MC9, MC10 and therefore the voice collecting beam signal composed of the voice collecting signals from these microphones MC8, MC9, MC10 is in excess of the predetermined threshold value. This voice collecting beam signal is subjected to the echo canceling and is transmitted to the voice conference device 1B together with the voice collecting direction information at $\theta=0°$ as the voice communication data. Similarly, when the conferee 203A in the session room 100A talks, a voice 303A is picked up by the voice conference device 1A. At this time, the voice 303A is picked up mainly by the microphones MC16, MC1, MC2 and therefore the voice collecting beam signal composed of the voice collecting signals from these microphones MC16, MC1, MC2 is in excess of the predetermined threshold value. This voice collecting beam signal is subjected to the echo canceling and is transmitted to the voice conference device 1B together with the voice collecting direction information at $\theta=180°$ as the voice communication data. At this time, when the voice 301A and the voice 303A are generated simultaneously, the voice communication data are constructed by time-dividing the voice collecting beam signals produced based upon these voices, as described above.

The voice conference device 1B in the session room 100B, when receives the voice communication data from the voice conference device 1A, produces the voice-emitting voice signals based on the voice collecting beam signals every voice collecting direction information. Then, since the voice collecting direction information of the voice-emitting voice signal based on the voice 301A is θ=0°, the voice conference device 1B gives the emitted voice signal SS1 based upon the voice-emitting voice signal to the speaker SP1 that emits the voice in the direction of θ=0°. Also, since the voice collecting direction information of the voice-emitting voice signal based on the voice 303A is θ=180°, the voice conference device 1B gives the emitted voice signal SS3 based upon the voice-emitting voice signal to the speaker SP3 that emits the voice in the direction of θ=180°. Accordingly, the voice conference device 1B emits a voice 401A of the conferee 201A in the session room 100A in the direction of θ=0°, and emits a voice 403A of the conferee 203A in the session room 100A in the direction of θ=180°. As a result, the conferees 202B, 204B who are seated in the session room 100B can hear the emitted voices from sound sources in positions corresponding to the positions of the conferees 201A, 203A who are seated in the remote session room 100A.

Conversely, when the conferee 202B in the session room 100B talks, a voice 302B is picked up by the voice conference device 1B. At this time, the voice 302B is picked up mainly by the microphones MC12, MC13, MC14 and therefore the voice collecting beam signal composed of the voice collecting signals from these microphones MC12, MC13, MC14 is in excess of the predetermined threshold value. This voice collecting beam signal is subjected to the echo canceling and is transmitted to the voice conference device 1A together with the voice collecting direction information at θ=90° as the voice communication data. Similarly, when the conferee 204B in the session room 100B talks, a voice 304b is picked up by the voice conference device 1B. At this time, the voice 304B is picked up mainly by the microphones MC4, MC5, MC6 and therefore the voice collecting beam signal composed of the voice collecting signals from these microphones MC4, MC5, MC6 is in excess of the predetermined threshold value. This voice collecting beam signal is subjected to the echo canceling and is transmitted to the voice conference device 1A together with the voice collecting direction information at θ=270° as the voice communication data. At this time, when the voice 302B and the voice 304B are generated simultaneously, the voice communication data are constructed by time-dividing the voice collecting beam signals produced based upon these voices, as described above.

The voice conference device 1A in the session room 100A, when receives the voice communication data from the voice conference device 1B, produces the voice-emitting voice signals based on the voice collecting beam signals every voice collecting direction information. Then, since the voice collecting direction information of the voice-emitting voice signal based on the voice 302B is θ=90°, the voice conference device 1A gives the emitted voice signal SS2 based upon the voice-emitting voice signal to the speaker SP2 that emits the voice in the direction of θ=90°. Also, since the voice collecting direction information of the voice-emitting voice signal based on the voice 304B is θ=270°, the voice conference device 1A gives the emitted voice signal SS4 based upon the voice-emitting voice signal to the speaker SP4 that emits the voice in the direction of θ=270°. Accordingly, the voice conference device 1A emits a voice 402B of the conferee 202B in the session room 100B in the direction of θ=90°, and emits a voice 404B of the conferee 204B in the session room 100B in the direction of θ=270°. As a result, the conferees 201A, 203A who are seated in the session room 100A can hear the emitted voices from sound sources in positions corresponding to the positions of the conferees 202B, 204B who are seated in the remote session room 100B.

In this manner, according to the configuration and the processes of the present embodiment, the talking voices are emitted in response to the positions of respective conferees in the voice conference devices 1A, 1B. As a result, all conferees who are seated in two session rooms 100A, 100B can attend the talk session with an unbounded feeling of presence.

Figure 5:
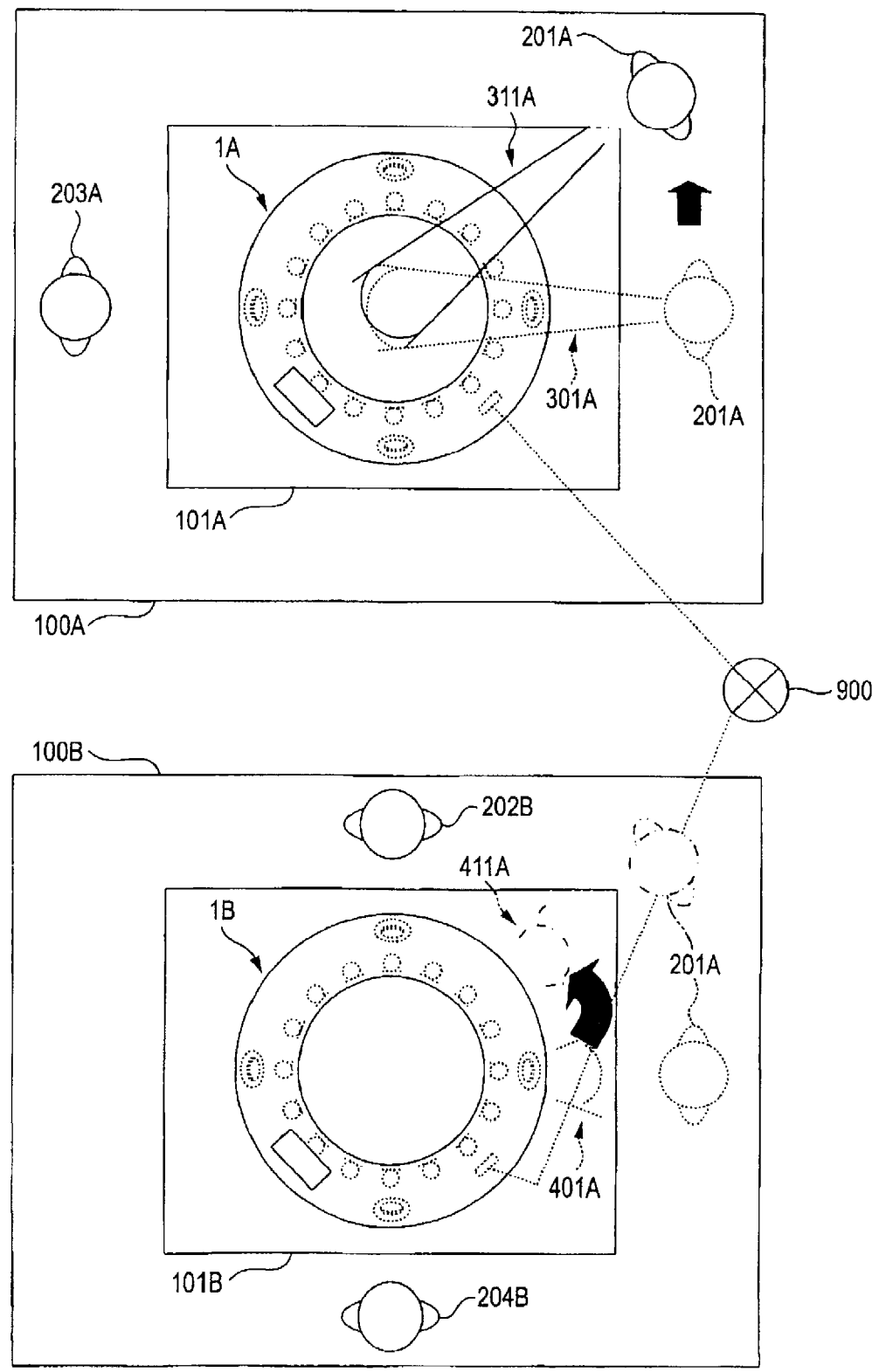
[FIG. 5] A view explaining a voice emitting/collecting situation when the conferee moved.

Meanwhile, sometimes the conferee moves during such session. FIG. 5 is a view explaining a voice emitting/collecting situation when the conferee moved to change the position.

As shown in FIG. 5, when the conferee 201A in the session room 100A moves rightward, a voice 311A of the conferee 201A after movement is picked up mainly by the microphones MC10, MC11, MC12 in the voice conference device 1A. Therefore, the voice collecting beam signal composed of the voice collecting signals from these microphones MC10, MC11, MC12 is in excess of the predetermined threshold value. This voice collecting beam signal is subjected to the echo canceling and is transmitted to the voice conference device 1B together with the voice collecting direction information at θ=45° as the voice communication data. Then, since the voice collecting direction information of the voice-emitting voice signal based on the voice 311A is θ=45°, the voice conference device 1B in the session room 100B gives the emitted voice signals SS1, SS2 based upon the voice-emitting voice signal to the speaker SP1 that emits the voice in the direction of θ=0° and the speaker SP2 that emits the voice in the direction of θ=90° at the same level respectively. When the speakers SP1, SP2 emit the emitted voice signals SS1, SS2 respectively, the voice level in the direction of θ=45° is increased and a voice 411A having the substantially same voice-emitting characteristic as that obtained when the voice is emitted directly in the direction of θ=45° can be obtained. Accordingly, following upon the movement of the conferee 201A from θ=0° to θ=45°, the conferees 202B, 204B in the session room 100B can hear the talking voice of the conferee 201A from the shifted position. As a result, all conferees can hold the talk session with a more unbounded feeling of presence.

Next, a voice conference system according to a second embodiment of the present invention will be explained with reference to the drawings hereunder.

Figure 6:
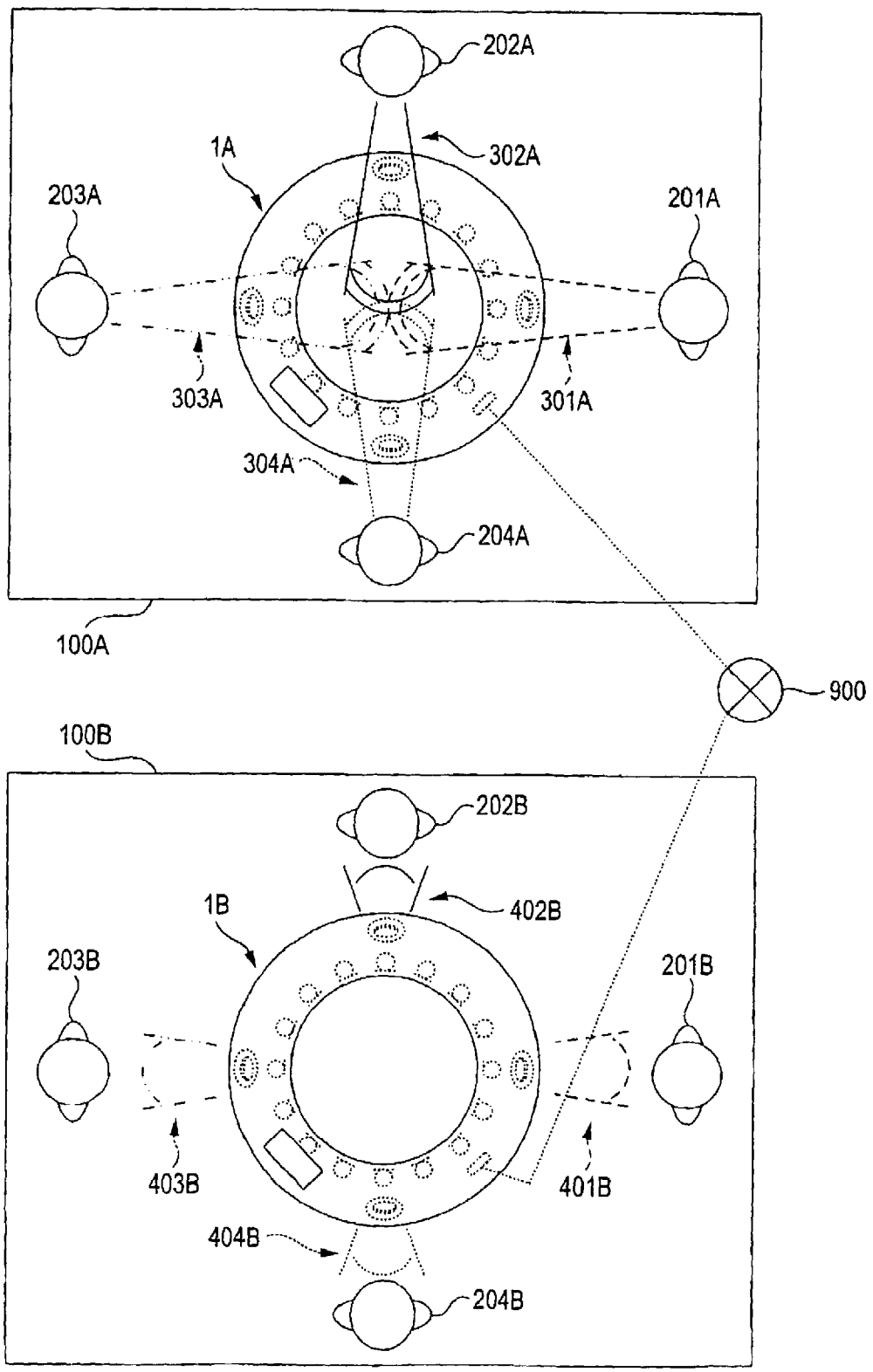
[FIG. 6] A view explaining a talk session situation when four conferees are seated in session rooms 100A, 100B according to a second embodiment of the present invention respectively.

FIG. 6 is a view explaining a talk session situation when four conferees are seated in the session rooms 100A, 100B according to a second embodiment of the present invention respectively.

Here, a configuration of the voice conference device is similar to that in the first embodiment, and therefore its explanation will be omitted herein.

In the session room 100A, the conferees 201A to 204A are seated. More particularly, the conferee 201A is seated in the direction of θ=0° of the voice conference device 1A, the conferee 202A is seated in the direction of θ=90° of the voice conference device 1A, the conferee 203A is seated in the direction of θ=180° of the voice conference device 1A, and the conferee 204A is seated in the direction of θ=270° of the voice conference device 1A. In contrast, in the session room 100B, the conferees 201B to 204B are seated. More particularly, the conferee 201B is seated in the direction of θ=0° of the voice conference device 1B, the conferee 202B is seated in the direction of θ=90° of the voice conference device 1B, the conferee 203B is seated in the direction of θ=180° of the voice conference device 1B, and the conferee 204B is seated in the direction of θ=270° of the voice conference device 1B. In other words, in the voice conference devices 1A, 1B, the conferee 201A, 201B are seated correspondingly in the same direction (the direction of θ=0°), the conferee 202A, 202B are seated correspondingly in the same direction (the direction of θ=90°), the conferee 203A, 203B are seated correspondingly in the same direction (the direction of θ=180°), and the conferee 204A, 204B are seated correspondingly in the same direction (the direction of θ=270°) respectively.

In such case, the voice 301A of the conferee 201A being picked up by the voice conference device 1A is emitted from the speaker SP1 of the voice conference device 1B as an emitted voice 401B that is directed from the voice conference device 1B to the conferee 201B. Similarly, a voice 302A of the conferee 202A being picked up by the voice conference device 1A is emitted from the speaker SP2 of the voice conference device 1B as the emitted voice 402B that is directed from the voice conference device 1B to the conferee 202B. Also, the voice 303A of the conferee 203A being picked up by the voice conference device 1A is emitted from the speaker SP3 of the voice conference device 1B as an emitted voice 403B that is directed from the voice conference device 1B to the conferee 203B. Also, a voice 304A of the conferee 204A being picked up by the voice conference device 1A is emitted from the speaker SP4 of the voice conference device 1B as the emitted voice 404B that is directed from the voice conference device 1B to the conferee 204B.

At this time, the voice conference devices 1A, 1B are shaped like the circular plate respectively, and the speakers SP1 to SP4 are arranged at an interval of 90° along the circumferential surface and emit the voice outward from the side surface of the unit respectively. Accordingly, the conferee 201B can only hear the voice of the conferee 201A exclusively, the conferee 202B can only hear the voice of the conferee 202A exclusively, the conferee 203B can only hear the voice of the conferee 203A exclusively, and the conferee 2048 can only hear the voice of the conferee 204A exclusively. As a result, the conferees can discuss four subjects simultaneously in parallel by using two voice conference devices 1A, 1B only.

In the case of such utilizing method, the conferees who are going to talk to each other must be seated in the same direction with respect to the voice conference devices 1A, 1B respectively. As the method of meeting this requirement, a seating chart may be prepared in advance, and the conferees may be seated in accordance with the seating chart. Alternately, four conferees may be seated in advance at one voice conference device and may say their own names, and then four conferees may be seated at the other voice conference device sequentially in accordance with the said name.

In addition, a voice emitting direction changing mode may be prepared in advance in the voice conference devices 1A, 1B, and first the conferees may be seated at both voice conference devices respectively and then their voice emitting directions may be changed. Specifically speaking, in the normal mode, the voice collecting direction and the voice emitting direction are set to coincide with each other as described above whereas, in the voice emitting direction changing mode, the voice collecting direction and the voice emitting direction may be set in any combinations. For example, the voice collecting direction θ=0° may be paired with the voice emitting direction θ=180°, the voice collecting direction θ=90° may be paired with the voice emitting direction θ=270°, the voice collecting direction θ=180° may be paired with the voice emitting direction θ=0°, and the voice collecting direction θ=270° may be paired with the voice emitting direction θ=90°. According to this mode, even when respective conferees are seated freely in the session rooms 100A, 100B without a seating chart, the persons who attend the talk session can emit and collect the voices individually respectively. Furthermore, these combinations may be stored previously, then the combinations may be displayed on a liquid crystal display of the operating portion 13, and then a desired combination may be selected by the operating portion 13. As a result, the combination of voice emission and collection can be set more easily.

In the above embodiments, such configurations are illustrated that the voice conference devices 1A, 1B transmit/receive the voice communication data via the network communication. In this case, as shown in FIG. 7, the voice signals may be transmitted/received via parallel communication.

Figure 7:
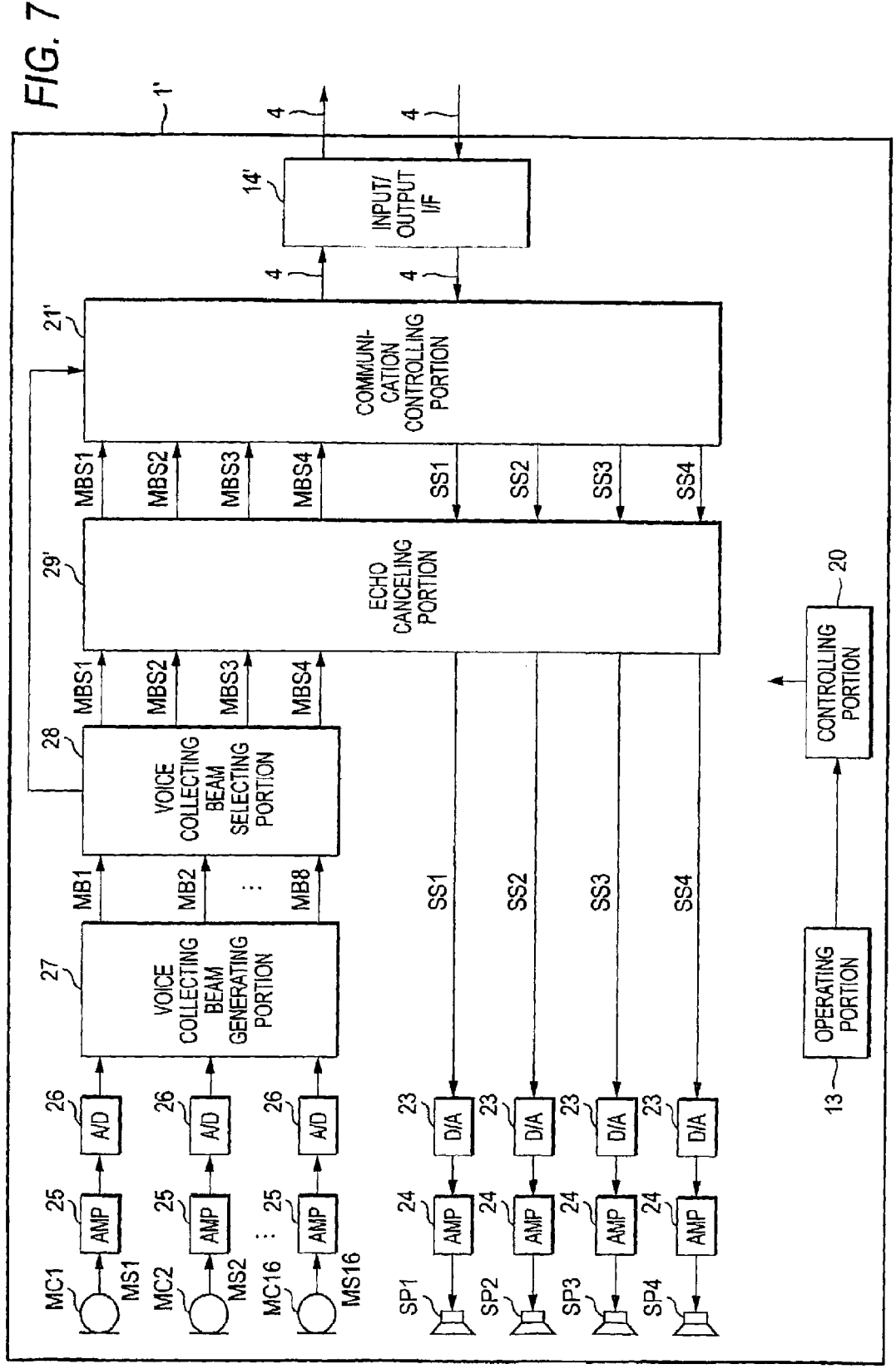
[FIG. 7] A block diagram showing a configuration of a voice conference device 1' that transmits/receives a voice signal via parallel communication.

FIG. 7 is a block diagram showing a configuration of a voice conference device 1' that transmits/receives the voice signal via parallel communication.

An input/output I/F 14' of the voice conference device 1' is connected to a parallel transmission line that has four line on the input side and the output side respectively. The input/output I/F 14' receives the emitted voice signals SS1 to SS4 being input in parallel, and gives these signals to a communication controlling portion 21'. The communication controlling portion 21' gives the input emitted voice signals SS1 to SS4 to the speakers SP1 to SP4 via an echo canceling portion 29', the D/A converters 23, and the voice emitting amplifiers 24. The speakers SP1 to SP4 convert the supplied emitted voice signals SS1 to SS4 into the voices, and emit the voice respectively.

The microphones MC1 to MC16, the voice collecting amplifiers 25, the A/D converters 26, the voice collecting beam generating portion 27, and the voice collecting beam selecting portion 28 of the voice conference device 1' are similar to those shown in the first embodiment. Therefore, their explanation will be omitted herein.

The echo canceling portion 29' produces the quasi regression voice signals based on the emitted voice signals SS1 to SS4 with respect to the selected voice collecting beam signals MBS1 to MBS4, and then subtracts the quasi regression voice signals from the selected voice collecting beam signals MBS1 to MBS4. Thus, the echo canceling portion 29' can suppress effectively the go-around voices.

The communication controlling portion 21' produces the emitted voice signals SS1 to SS4 from the selected voice collecting beam signals MBS1 to MBS4, from which the regression voice is removed, and the voice collecting direction information every destination speaker by using the above mixing process, etc., and then transmits these signals to the destination voice conference devices via four lines of the input/output I/F 14' on the output side.

With this configuration, as mentioned above, the talk session can be held with an unbounded feeling of presence in session and also the talk sessions about a plurality of subjects can be held simultaneously in parallel.

The present invention is explained in detail with reference to the particular embodiments as above. But it is apparent for those skilled in the art that various variations and modifications can be applied without departing from claims and a scope or an intended range of the present invention.

This application is based upon Japanese Patent Application (Patent Application No. 2006-210054) filed on Aug. 1, 2006; the contents of which are incorporated herein by reference.

The invention claimed is:
1. A voice conference device comprising:
a circular plate-like case;
a plurality of unidirectional microphones arranged along a first circle of the case and spaced at predetermined spacing along the first circle;

a plurality of speakers arranged along a second circle of the case and spaced at equal intervals along the second circle;
a voice collecting portion, including adding, delaying, and level detecting circuits;
a communication controlling portion, including an input/output interface; and
a voice emitting portion, including a mixing circuit,
wherein the voice collecting portion:
    generates voice collecting beam signals from voice collecting signals picked up by the plurality of unidirectional microphones in plural different voice collecting directions respectively;
    selects the voice collecting beam signal based on the voice emitted from a conferee from the formed voice collecting beam signals; and
    detects voice collecting direction information corresponding to the selected voice collecting beam signal,
wherein the communication controlling portion:
    generates voice communication data having the voice collecting beam signal selected by the voice collecting portion and the voice collecting direction information detected by the voice collecting portion;
    then transmits the voice communication data to another voice conference device on an opposite side;
    acquires the voice collecting direction information and the voice collecting beam signal contained in the voice communication data received from the another voice conference device on the opposite side; and
    supplies a voice-emitting voice signal produced from the acquired voice collecting beam signal and the acquired voice collecting direction information acquired from the another voice conference device on the opposite side to the voice emitting portion,
wherein the voice emitting portion produces and supplies voice emitting signals to the plurality of speakers, based on the voice-emitting voice signal from the communication controlling portion and the voice collecting direction information transmitted from the another voice conference device on the opposite side,
wherein the first and second circles and the circular plate-like case are concentrically aligned, and
wherein each of voice emitting directions of the plurality of speakers is directed outwardly away from a center of the second circle.

2. The voice conference device according to claim 1, wherein the voice collecting portion includes an echo canceling portion, including echo canceling circuits, that produces a quasi regression voice signal based on the selected voice collecting beam signal and the received voice-emitting voice signal, and then subtracts the quasi regression voice signal from the selected voice collecting beam signal.

3. A voice conference device comprising:
a circular plate-like case;
a plurality of unidirectional microphones arranged along a first circle of the case and spaced at predetermined spacing along the first circle;
a plurality of speakers arranged along a second circle of the case and spaced at equal intervals along the second circle;
a voice collecting portion, including adding, delaying, and level detecting circuits; and
a communication controlling portion, including an input/output interface,
wherein the voice collecting portion:
    generates voice collecting beam signals from voice collecting signals picked up by the plurality of unidirectional microphones in plural different voice collecting directions respectively;
    selects the voice collecting beam signal based on the voice emitted from a conferee from the formed voice collecting beam signals; and
    detects voice collecting direction information corresponding to the selected voice collecting beam signal,
wherein the communication controlling portion:
    converts the voice collecting beam signal selected by the voice collecting portion into a voice emitting signal for another voice conference device on an opposite side based on the detected voice collecting direction information; and
    then transmits the voice emitting signal; and
    supplies the voice emitting signal received from the another voice conference device on the opposite side to the plurality of speakers,
wherein the first and second circles and the circular plate-like case are concentrically aligned, and
wherein each of voice emitting directions of the plurality of speakers is directed outwardly away from a center of the second circle.

4. The voice conference device according to claim 3, wherein the voice collecting portion includes an echo canceling portion, including echo canceling circuits, that produces a quasi regression voice signal based on the selected voice collecting beam signal and the received voice-emitting voice signal, and then subtracts the quasi regression voice signal from the selected voice collecting beam signal.

5. A voice conference system comprising:
a plurality of voice conference devices connected mutually via a network;
wherein each of the plurality of voice conference devices includes:
a circular plate-like case;
a plurality of unidirectional microphones arranged along a first circle of the case and spaced at predetermined spacing along the first circle;
a plurality of speakers arranged along a second circle of the case and spaced at equal intervals along the second circle;
a voice collecting portion, including adding, delaying, and level detecting circuits;
a communication controlling portion, including an input/output interface; and
a voice emitting portion, including a mixing circuit,
wherein the voice collecting portion:
    generates voice collecting beam signals from voice collecting signals picked up by the plurality of unidirectional microphones in plural different voice collecting directions respectively;
    selects the voice collecting beam signal based on the voice emitted from a conferee from the formed voice collecting beam signals; and
    detects voice collecting direction information corresponding to the selected voice collecting beam signal,
wherein the communication controlling portion:
    generates voice communication data having the voice collecting beam signal selected by the voice collecting portion and the voice collecting direction information detected by the voice collecting portion then transmits the data to at least one destination voice conference device among the plurality of voice conference devices;

acquires the voice collecting direction information and the voice collecting beam signal contained in the voice communication data received from the at least one destination voice conference device; and supplies a voice-emitting voice signal produced from the acquired voice collecting beam signal and the acquired voice collecting direction information from the at least one destination voice conference device to the voice emitting portion, wherein the voice emitting portion produces and supplies voice emitting signals to the plurality of speakers, based on the voice-emitting voice signal from the communication controlling portion and the voice collecting direction information transmitted from the at least one destination voice conference device, wherein the first and second circles and the circular plate-like case are concentrically aligned, and wherein each of voice emitting directions of the plurality of speakers is directed outwardly away from a center of the second circle.

6. A voice conference system comprising:

a plurality of voice conference devices connected mutually via connecting portions;

wherein each of the plurality of voice conference devices includes:

a circular plate-like case;

a plurality of unidirectional microphones arranged along a first circle of the case and spaced at predetermined spacing along the first circle;

a plurality of speakers arranged along a second circle of the case and spaced at equal intervals along the second circle;

a voice collecting portion, including adding, delaying, and level detecting circuits; and a communication controlling portion, including an input/output interface, wherein the voice collecting portion:

generates voice collecting beam signals from voice collecting signals picked up by the plurality of unidirectional microphones in plural different voice collecting directions respectively;

selects the voice collecting beam signal based on the voice emitted from a conferee from the formed voice collecting beam signals; and detects voice collecting direction information corresponding to the selected voice collecting beam signal, wherein the communication controlling portion:

converts the voice collecting beam signal selected by the voice collecting portion into a voice emitting signal for another voice conference device on an opposite side based on the detected voice collecting direction information;

then transmits the voice emitting signal; and supplies the voice emitting signal received from the another voice conference device on the opposite side to the plurality of speakers, converts the voice collecting beam signal selected by the voice collecting portion into a voice emitting signal for at least one destination voice conference device among the plurality of destination voice conference devices based on the detected voice collecting direction information;

then transmits the voice emitting signal; and supplies the voice emitting signal received from the at least one destination voice conference device to the plurality of speakers, wherein the first and second circles and the circular plate-like case are concentrically aligned, and wherein each of voice emitting directions of the plurality of speakers is directed outwardly away from a center of the second circle.

* * * * *